Sept. 6, 1960     P. CANNON     2,951,552
GAS SEPARATOR
Filed June 23, 1958     3 Sheets-Sheet 1
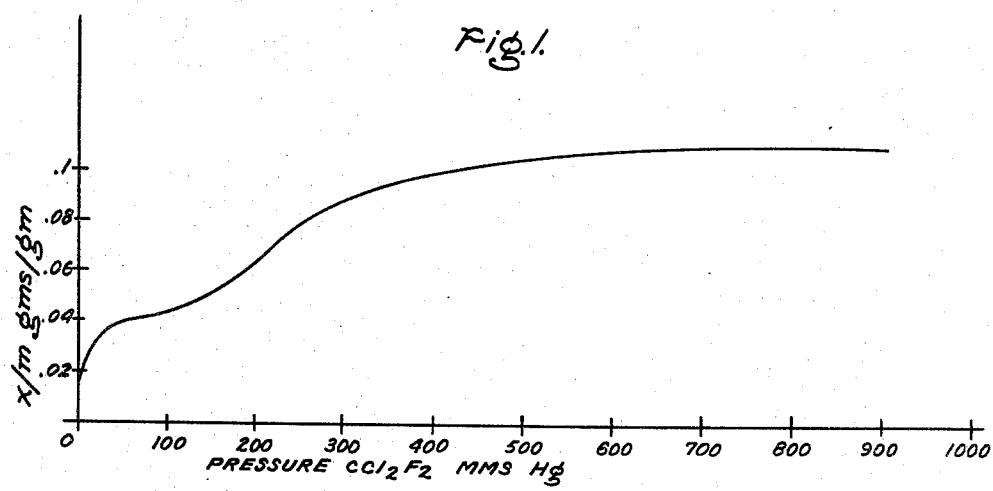
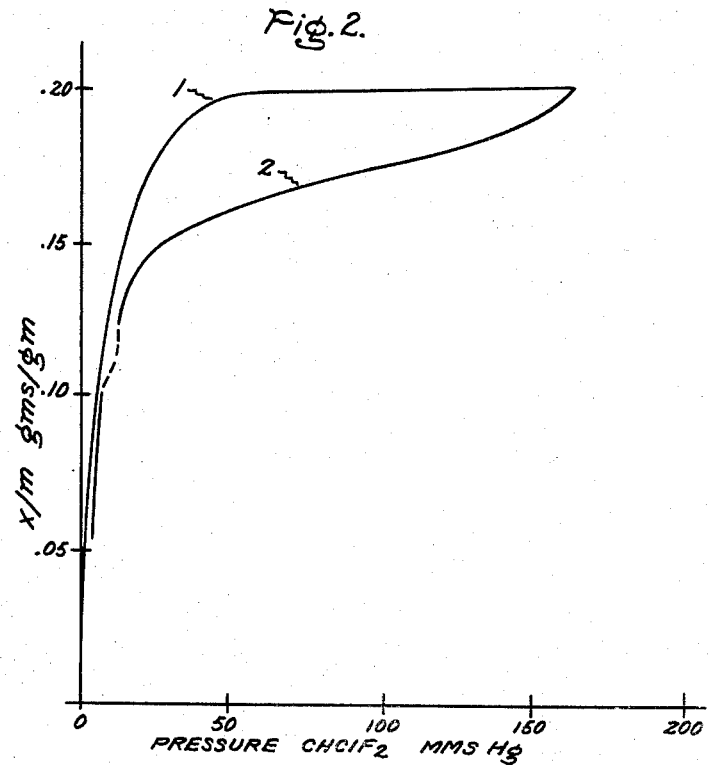
Inventor:
Peter Cannon,
by Joseph T. Cohen
His Attorney.

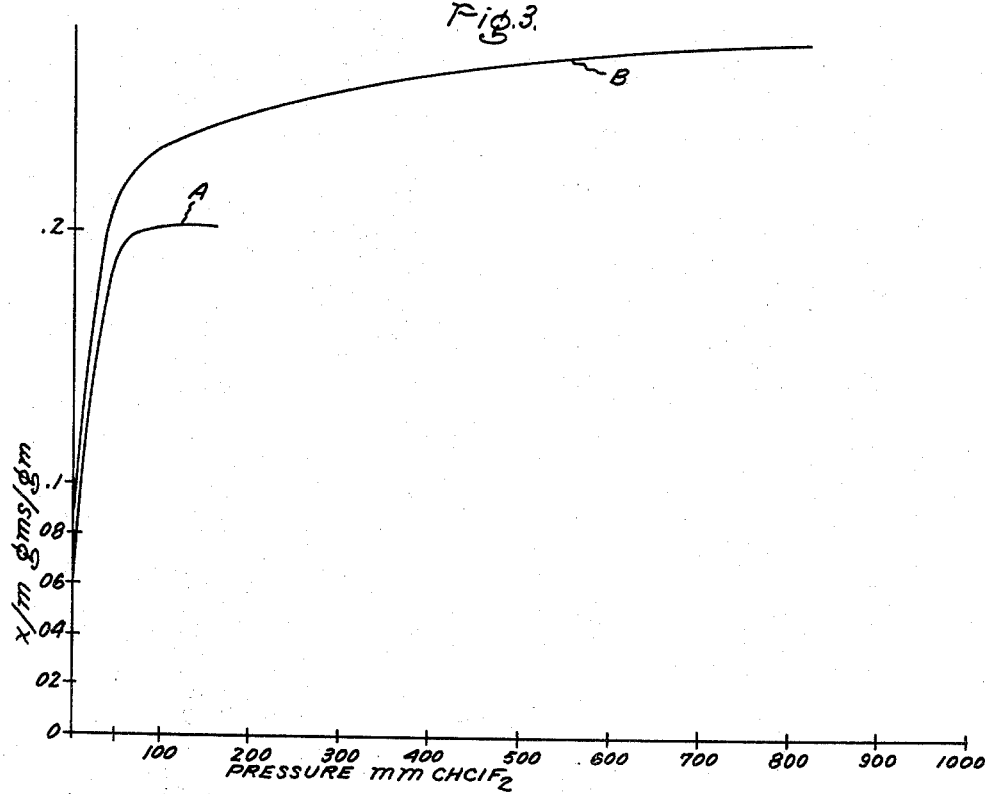
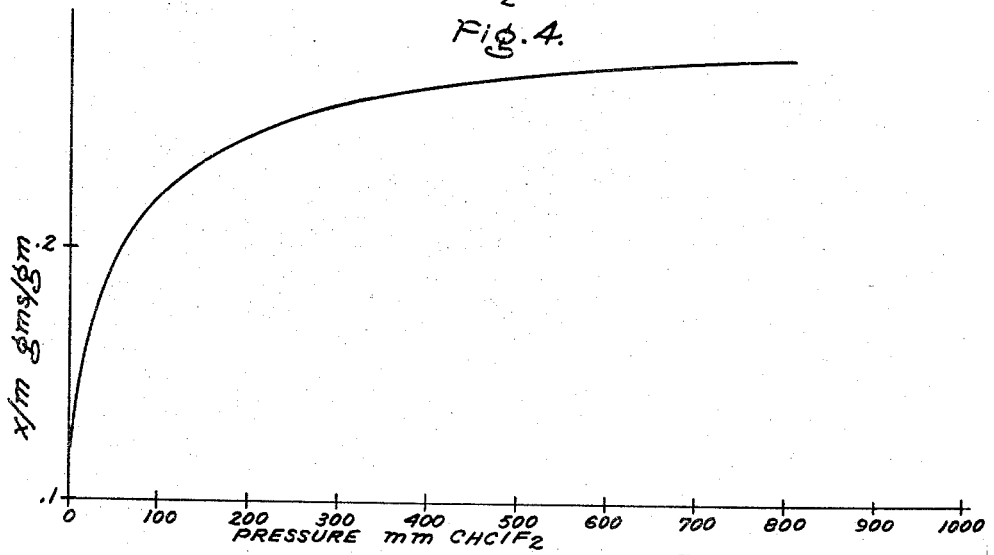

Sept. 6, 1960 P. CANNON 2,951,552
GAS SEPARATOR
Filed June 23, 1958 3 Sheets-Sheet 3
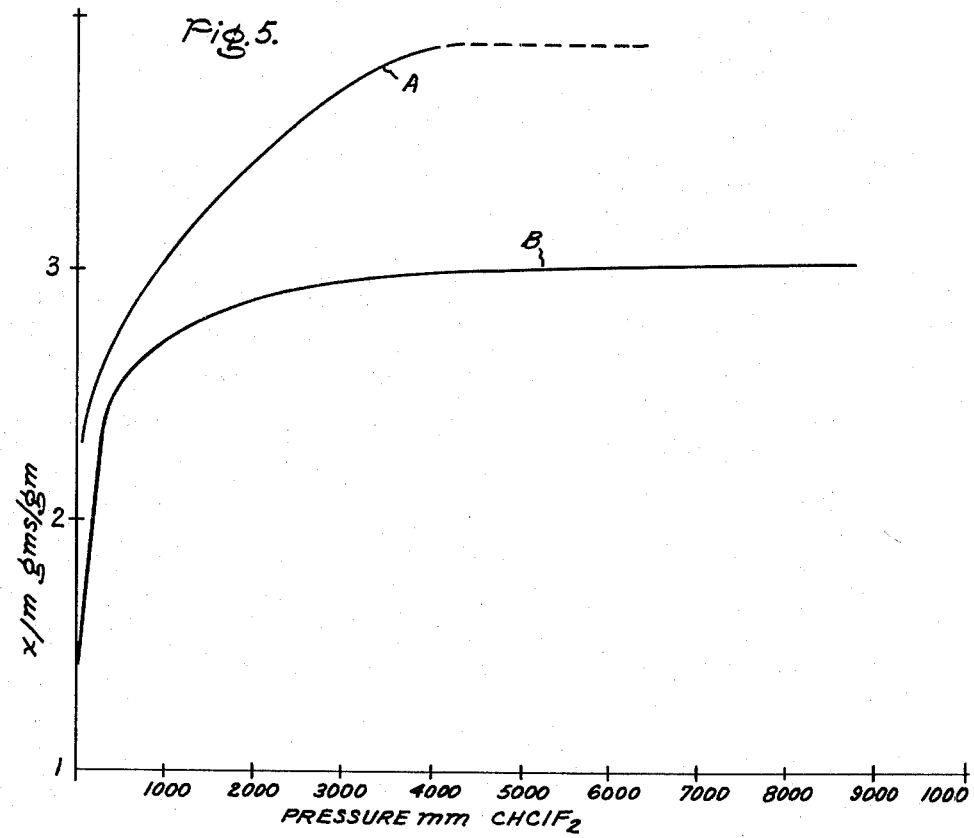
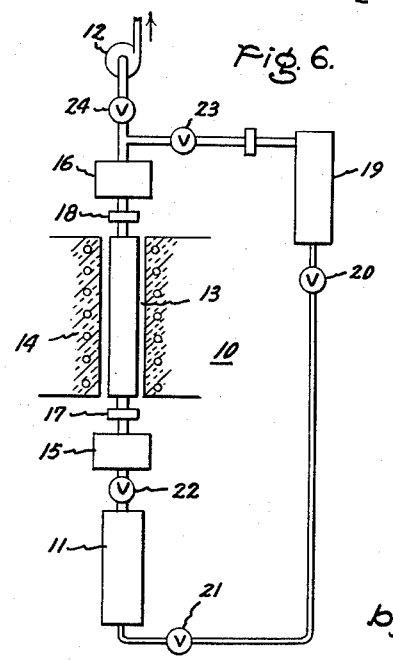
Inventor:
Peter Cannon,
by Joseph T. Cohen
His Attorney.

United States Patent Office 2,951,552
Patented Sept. 6, 1960

2,951,552

GAS SEPARATOR

Peter Cannon, Scotia, N.Y., assignor to General Electric Company, a corporation of New York Filed June 23, 1958, Ser. No. 743,601

9 Claims. (Cl. 183—4.5)

This invention relates to a separator for gases, liquids, or vapors and, more particularly, to a modified form of a zeolite having selective adsorption characteristics with respect to Freon gases.

The word "Freon" is used to describe that group of halogenated hydrocarbons containing one or more fluorine and/or chlorine atoms and is descriptive of the Freons of E. I. du Pont de Nemours & Company. The Freon gases find extended use as refrigerants, for example, $CCl_2F_2$ and $CHClF_2$ or Freon-12 and Freon-22, being dichlorodifluoromethane and monochlorodifluoromethane, respectively.

The term "gas separation" is employed to include the separation of gases, liquids or vapors, and/or mixtures thereof. This type of separation finds wide application in commercial processes where the separation of gaseous mixtures is desired for the production of a particular gas, or where the exclusion of one or more gases from a system is desired.

Among the numerous examples of materials utilized generally as separators are activated carbon, the silica gels, and others of like nature. The desirable characteristics of these materials is their peculiar ability to absorb, adsorb, or otherwise take up a large amount of a given gas in proportion to their own weight, and in some instances a further desirable characteristic is the relative ease with which these materials may be made to give up or release the sorbed gas.

A particular material of some import is a molecular sieve, so-called because of the myriad pores or capillaries present which, dependent on molecular size and compensating ion charge, take up or retain a certain gas to the exclusion of others. A molecular sieve in one form is a natural or synthetic crystalline zeolite having good sorption characteristics with respect to various gases. However, these characteristics depend to a great extent upon a given gas to be sorbed, the temperature conditions under which the process is carried out, and the work input necessary for the material to release the sorbed gas.

Such a molecular sieve becomes even more important and desirable for many separating applications if the capacity intake could be greatly increased with respect to certain gases or where additional gases may be taken up. A further improvement on the molecular sieve would relate to a suitable modification of the sieve material such that the sorption and desorption process may proceed economically, feasibly, reversibly, highly selectively, and at reasonable temperatures with a low work input.

In the field of Freon gases, a material which would effectively sorb and release one Freon gas to the exclusion of another is important not only in the initial production and separation of these gases, but where such gases may be employed in a refrigeration system for variable capacity refrigeration. Such a variable capacity refrigeration system would employ a separator or adsorber as a control means to adsorb or desorb one Freon to the exclusion of another for one level of refrigeration or change in capacity, and with a low work input made to desorb the retained Freon for a second level refrigeration or change in capacity. The use of a molecular sieve for refrigeration purposes is disclosed in a copending application, Serial No. 743,532, Etherington, filed concurrently herewith and assigned to the same assignee as the present invention.

Accordingly, it is an object of this invention to provide an improved molecular sieve gas separator.

It is another object of this invention to provide an improved molecular sieve separator for Freon gases.

It is yet another object of this invention to provide an improved molecular sieve separator for Freon mixtures.

It is a further object of this invention to provide an improved molecular sieve separator for Freon-12 and Freon-22 mixtures.

Briefly described, this invention contemplates in its broader form a modified molecular sieve as a general selective sorption and separating agent, and particularly to a sorptive agent for Freon gases. In another sense, this invention is directed to a particular sorptive agent for Freon-12 and Freon-22 mixtures for the initial production thereof and for use in systems employing Freon gases.

The invention will be better understood when taken in connection with the following description and the drawing, in which:

Fig. 1 is a curve showing the adsorption, by weight, of Freon-12 by a molecular sieve;

Fig. 2 is a curve showing the adsorption, by weight, of Freon-22 by a molecular sieve;

Fig. 3 is a curve B showing the adsorption, by weight, of Freon-22 by a sieve modified in accordance with this invention compared to a curve A of an unmodified sieve;

Fig. 4 is a curve showing the adsorption, by weight, of Freon-22 from an equal mixture of Freon-12 and Freon-22;

Fig. 5 is a curve showing the variation in adsorption of Freon-22 on a modified sieve at different temperatures; and Fig. 6 is an exemplary schematic drawing of one form of gas separation apparatus.

The basic material utilized as the separating agent in this invention is a modified form of a synthetic crystalline zeolite, a more complete description of which may be found in the Journal of the American Chemical Society, vol. 78, No. 23, December 8, 1956, pages 5963–5977. The synthetic zeolite which is designated therein by Type A is represented by the formula $$Na_{12}[(AlO_2)_{12}(SiO_2)_{12}] \cdot 27H_2O$$

The structure is cubic, $a_0 = 12.32$ A., space group

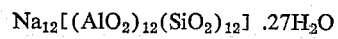

and is characterized by a three-dimensional network consisting of cavities 11.4 A. in diameter, separated by circular openings 4.2 A. in diameter. Removal of the water leaves a stable crystalline solid containing mutually connected intra-crystalline voids amounting to 45 volume percent of the zeolite. A high capacity adsorbent is described which readily occludes molecules of a certain size and shape, but excludes others. Sodium ions, accessible through the intra-crystalline voids or pores, undergo cation exchange readily in aqueous solution. Replacement of sodium ions by calcium ions effectively enlarges the pore openings so that straight chain hydrocarbons are readily adsorbed but branch chain hydrocarbons are excluded. The formula then becomes

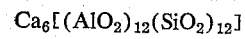

Although similar in chemical composition, the crystalline zeolites are completely different in structure from the gel type alumino silicates commonly referred to as zeolites. As members of an unusual group of minerals, the zeolites have been known for many years. Structurally, the zeolites of importance as adsorbents consist of a three-dimensional network of $SiO_4$ and $AlO_4$ tetrahedra with each oxygen shared with another tetrahedron, so that the ratio $O/(Al+Si)=2$. Electrical neutrality is achieved by the inclusion of alkali or alkaline earth ions such as $Na^+$, $K^+$, $Ca^{++}$, $Sr^{++}$ or $Ba^{++}$, and interstitial voids contain water molecules which may be removed reversibly or replaced by other species. Depending on the size of these interstitial voids, other molecular species may be readily adsorbed, slowly adsorbed, or completely excluded. More particularly, the starting synthetic crystalline zeolite of this invention is the zeolite represented by the first of the above-given chemical formula wherein the sodium ions have been replaced by calcium ions. Such a zeolite, represented by the formula $$Ca_6[(AlO_2)_{12}(SiO_2)_{12}] \cdot 27H_2O$$

is commercially available as a molecular sieve. It was discovered that when employing the above latter described molecular sieve to adsorb Freon-22, the sieve caused, over a period of time, some decomposition of the Freon-22. On the other hand, when the molecular sieve was employed to adsorb Freon-12, it was discovered that the Freon-12 adhered to the molecular sieve with a high degree of tenacity and was not released therefrom even when subjected to a high vacuum over a long period of time. Furthermore, the sorption equilibrium of the Freon-12 on the molecular sieve is exceptionally slow. These features will be more clearly understood when taken in connection with Figs. 1–6 and the description thereto.

The curve of Fig. 1 shows the adsorption characteristics of the molecular sieve, 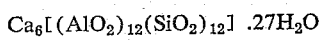 on Freon-12. This curve was obtained at 30° C. and indicates the adsorption $X/M$ values at different Freon-12 pressures. A similar curve for a temperature of 35° C. indicates an $X/M$ value proportionately less than at 30° C. $X/M$ is the grams of Freon-12 adsorbed per gram of molecular sieve. The procedure for obtaining the curve results is outlined in the following example.

*Example 1*

A sample of the molecular sieve in one form, generally described as extruded pellets of approximately 1/16 inch in diameter and 1/8 inch in length, was placed on a weighing balance in an evacuating chamber, and outgassed at $10^{-2}$ microns pressure for 15 hours at 350° C. The system was then brought to equilibrium at 29.6° C. and previously distilled freeze-dried Freon-12 admitted. The weight of Freon-12 taken up or adsorbed in relation to the weight of the sieve was recorded over a 20 hour period and found to be approximately 20 percent.

When an attempt was made to remove the Freon-12 from the sample, in Example 1, by lowering the pressure, low pressure conditions were attained in a very short period of time, with no appreciable decrease in sample weight. The negligible decrease in weight approximated 0.01 gram. The combined effect of lowering the pressure while at the same time heating the sample had no appreciable effect in removing the Freon-12, and, after extending the process to approximately 200° C., some gas began to be removed, but still in negligible quantities. During the attempted evacuation, low pressures were achieved, on the order of 0.1 to 0.01 micron, this pressure being obtained within 2 hours of starting the evacuation from an originating point of 1000 millimeters of Freon-12 pressure.

The curves of Fig. 2 shows the adsorption-desorption characteristics of the molecular sieve on Freon-22. The curve results were obtained by the procedure previously outlined in Example 1 with the exception that the equilibrium temperature was maintained at 25° C. The desorption curve was obtained by evacuation of the chamber with recordings made over a 4 hour period. The curve illustrates an important aspect of the adsorption of Freon-22 by a molecular sieve in that the adsorption equilibrium was obtained in approximately 1 hour, or less.

The desorption effect is easily seen with respect to the pressure changes. The desorption curve shows the apparent irreversibility of this system. Upon the removal of but little of the system gas, a large loss in weight of the sample is indicated, placing the desorption curve below that of the adsorption curve 1.

One of the important aspects of this invention relates to the adsorption of Freon-22 by a molecular sieve which has been previously modified by the adsorption of Freon-12. Figs. 1 and 2 indicate the general characteristics of adsorption of Freon-12 and Freon-22 by an unmodified or clean molecular sieve but do not indicate that, while the molecular sieve may be employed to adsorb Freon-12 or Freon-22, the modified molecular sieve with preadsorbed Freon-12 will adsorb Freon-22 individually from a mixture of Freon-12 and Freon-22 with no decomposition effects from the Freon-22. Furthermore, these curves do not indicate that the modified molecular sieve will adsorb a far greater capacity of Freon-22 than an unmodified sieve, or that desorption of the Freon-22 may be carried out with little or no simultaneous desorption of the Freon-12 taken up in the modification process. The method of modifying such a molecular sieve is given in the following example.

*Example 2*

A molecular sieve was modified by having Freon-12 vapor adsorbed thereon to an $X/M$ value of 0.193 and was prepared by allowing the sample to remain 7 days in an evacuating chamber in contact with Freon-12 vapor at more than 2000 millimeters' pressure at room temperature. The sample was then degassed to approximately 1/100 micron pressure, stabilized at 35° C. and 3138.9 millimeters' pressure of Freon-12 admitted. After 24 hours, only a small change in weight had taken place. The change in sorption, $\Delta X/M$, was 0.0031 which is indicative of sorption taking place on the outside of the solid only, and that the sieve was saturated with respect to Freon-12 by that quantity of gas which had been adsorbed earlier. The system was again evacuated at room temperature at approximately 26° C. for a 24 hour period, after which the sample weight had returned to its previous value, corresponding with an $X/M$ of 0.193.

When the molecular sieve as modified in the foregoing Example 2 was exposed to Freon-22 adsorption, it was discovered that not only was Freon-22 readily adsorbed by the modified sieve, but that the capacity of the modified sieve with respect to adsorbing Freon-22 was greatly increased over a clean sieve adsorbing Freon-22. This is clearly illustrated by the following example.

*Example 3*

With the modified molecular sieve from Example 2 in the evacuation chamber, Freon-22 vapor was admitted at 35° C. and the pressure allowed to become equalized at 2047 millimeters of mercury. After approximately 4 hours, the value of the ratio $X/M$, the amount of material adsorbed, had increased by 0.127 to a total of 0.320; that is, the sieve now held 32 percent of its own weight of mixed Freons. Further, Freon-22 vapor was admitted until the pressure was about 5460 millimeters, approximately 80 pounds' gage. Sufficient vapor was taken up so that the weight increase rose markedly, the total amount of Freon-22 taken up being in excess of $X/M=0.25$. The total fractional change in weight of the original sample (including sorbed Freon-12) was in excess of 0.44.

The sorption of Freon-22 on a modified molecular sieve was found to be reversible and no decomposition reactions were indicated. Experiments involving sorption from mixtures of Freon-12 and Freon-22 gases showed only that the Freon-22 was removed.

The unique results of the modification of the molecular sieve are very clearly illustrated in Fig. 3, which shows the adsorption comparison of a modified to an unmodified molecular sieve. Curve A of Fig. 3 is similar to the curve 1 of Fig. 2 and indicates the adsorption of Freon-22 by a clean sieve. Curve B of Fig. 3 shows the reversibility of, and the adsorption of Freon-22 by a molecular sieve modified in accord with this invention. The difference is believed to be quite evident.

The modified molecular sieve not only shows a marked increase in capacity for Freon-22, but displays further excellent selective characteristics for adsorbing Freon-22 from a Freon-12, Freon-22 mixture. Fig. 4 illustrates the comparison of the adsorption characteristics for the modified sieve upon a mixture of Freon-12 and Freon-22. The adsorption of Freon-22 from a mixture of Freon-12 and Freon-22 upon the modified molecular sieve was accomplished in the following manner.

*Example 4*

An equal-weight mixture, total 200 grams of Freon-12 and Freon-22, was prepared. This corresponds with a molar ratio of Freon-12 to Freon-22 equal to 1:1.398. At pressures removed from the saturation pressure of either gas, it was assumed that the partial pressure of each component was proportional to the molar fraction of that gas. With the molecular sieve as modified in accordance with this invention and placed within an evacuating chamber, studies were made at a total pressure up to 500 millimeters of the Freon mixture. The gravimetric increase in weight with pressure in these experiments coincides with that due to the partial pressure of Freon-22 alone. After approximately 5 hours at 30° C. and 120 millimeters of pressure, the Freon-22 content of the gas fell from 58.3 percent to 38.3 percent. No indication was obtained that the modified molecular sieve adsorbed any Freon-12 from the mixture. A reversal of the process was accomplished by pumping the entire system for a short period of time.

Only a low work input is necessary to produce a large change in the amount of Freon-22 that is adsorbed, and the modified material has the characteristic of extraordinary selectivity to the mixture of Freon-12 and Freon-22.

A change in the amount of Freon-22 adsorbed, $X/M$ of 0.1, may be produced by changing the pressure of the Freon-22 from 100 millimeters' pressure at approximately 30° C. to saturation at 30° C., or by altering the system temperatures from 30° C. to 10° C. at saturation pressure. This $X/M$ value corresponds with an uptake of Freon-22 by the modified molecular sieve approximately 7 pounds Freon-22 per cubic foot of the chemically modified sieve. Under these same circumstances, if adsorption occurred from Freon-12, Freon-22 mixture, there would be virtually no change in the total amount of Freon-12 in the gas phase. There is thus presented an efficient method of removing Freon-22 from a Freon-12, Freon-22 mixture at will, with a low work input, because the adsorption energies at high pressure are considerably less than latent heat of condensation of the gases. The removed Freon-22 may be replaced in the gas phase by restoring the original conditions. This is accomplished by placing the solid in contact with the gas when it is more lean in Freon-22 or by raising the temperature of the sieve slightly.

Fig. 5 illustrates a pair of curves A and B with curve A representing the adsorption of Freon-22 by a modified sieve at 0° C. and curve B representing the adsorption of Freon-22 by a modified sieve at 30° C.

While this description has proceeded with particular reference to a specific molecular sieve $$Ca_6[(AlO_2)_{12}(SiO_2)_{12}]$$

it is apparent that other and closely related sieves may be so modified to provide new adsorption, desorption characteristics. For example, chabazite, having the formula $CaAl_2Si_4O_{12}(H_2O)_6$ is similar in structure. Comparison of this zeolite to the modified sieve of this invention may be made by the well known argon test, which is generally employed as a standard laboratory measure. Argon adsorption on both the sieve of this invention and chabazite was found to have similar results with respect to energy changes.

It is not necessary that the molecular sieve be modified in any particular apparatus or for express purposes. Molecular sieves may be modified up to and including saturation and made available as a particular article or separator. The sorptive capacity of the modified sieve for water has been found to be only slightly less than that of an unmodified sieve and is thus indicative of the modified sieve being a good desiccant and a desirable one in Freon systems. An application of the modified sieve in a given system would be preferably separate from the sieve employed as a Freon adsorber and permitting water adsorption from the Freon or Freons before their particular adsorption.

One application of the modified sieve of this invention relates to a separator employed in the initial production of Freons or as a purifier. The modified sieve eliminates many of the problems and disadvantages inherent in the separation of closely related gases such as Freon-12 and Freon-22.

Referring now to Fig. 6, an exemplary separator apparatus 10 is a conduit-like affair including a source or supply 11 of mixed gases, for example Freon-22 and other Freons or gases, and a source of low pressure or pump 12. Between the supply 11 and the low pressure source 12 there is positioned a cartridge 13, containing a supply of the modified molecular sieve, which is connected in fluid flow relationship to the gas mixture supply 11 and the low pressure source 12. The desired temperature conditions and control are maintained by means of a furnace or other suitable heating device 14 surrounding the cartridge 13. A pair of thermal cells 15 and 16 are employed, on each side of the furnace 14, to sample the mixture of gases entering the furnace and the gas leaving the furnace. The thermal cells 15 and 16 may be temperature responsive, and integrated in a suitable comparator device to control furnace temperatures. In this invention the thermal cell 15 includes a well known form of gas analyzer in the comparator to ascertain the entering mixture and cell 16 further includes a gas analyzer to ascertain the leaving gas or mixture. Thermal insulators or guards 17 and 18 are provided between the furnace 14 and each of the thermal cells 15 and 16. The overall system includes a sink vessel 19 connected in fluid flow relationship to the supply 11 and to the low pressure source 12.

The operation of this apparatus may be automatically or manually controlled as desired. For illustration purposes, control is exercised by means of the indicated valves 20, 21, 22, 23 and 24. The apparatus may be employed to separate gases, to remix separated gases, and to withdraw the adsorbed gas or the remaining mixture or gas. These operative features are easily understood from the operating process, as follows.

Initially, the system is evacuated, valves 20, 21, 22, 23 and 24 are closed, the furnace is off, the supply vessel 11 is charged with a mixture of gases, for example Freon-22 and Freon-12, and the cartridge 13 contains the molecular sieve modified in accordance with this invention. Thereafter, valve 22 is opened permitting the mixture of gases to flow through cell 15 to the cartridge 13. Cell 15 provides an indication of the mixture components. Freon-22 is adsorbed by the molecular sieve in cartridge 13 while Freon-12 or the remaining gas or gases flow through cell 16 where an indication is observed of the change in the mixture on the amount of Freon-22 adsorbed. Valve 23 is then opened to permit the remaining gas to flow into sink 19.

In order to remove the adsorbed Freon from cartridge 13, valves 22 and 23 are closed and valve 24 is opened. Thereafter, the low pressure source 12 withdraws adsorbed Freon-22 from the cartridge 13 and furnace 12 raises the temperature of the sieve as required. The remaining gas in sink 19 may be removed from the system by maintaining valve 22 closed along with valves 20 and 21. Opening of valves 23 and 24 may in some instances permit the low pressure source to withdraw the mixture from sink 19 after the adsorbed Freon-22 has been withdrawn. Alternately, the remaining gas may be withdrawn from sink 19 through a suitable outlet provided therein. The gases may be remixed, however, by opening valves 20 and 21 and permitting the remaining gas in the sink 19 to flow into supply 11.

It is understood that additional valves may be employed in this apparatus for various or additional sequences of operation. Specifically, there is illustrated an exemplary apparatus employing the modified sieve of this invention as a selective adsorber or separator. The use of the modified molecular sieve as capacity variant means in a refrigeration system is disclosed and fully described in my copending application Serial No. 743,602, Etherington and Cannon, assigned to the same assignee as the present invention, and filed concurrently herewith.

While a unique separator or adsorber has been described, it will be apparent to those skilled in the art that various modifications of this separator are contemplated to be within the scope of this invention. The particular use of the separator as a general selective adsorptive agent or a mixture variant in systems employing one or more of the Freons is not to be considered restrictive to the broad application of this invention. It is, therefore, intended in the following claims to include all such modifications within the inventive scope.

What I claim as new and desire to secure by Letters Patent of the United States is:

1. A method of separating $CCl_2F_2$, $CHClF_2$ mixtures with crystalline zeolite molecular sieve material which comprises, degassing the molecular sieve, exposing the sieve to $CCl_2F_2$ for adsorption thereof, and exposing the sieve with the adsorbed $CCl_2F_2$ to mixtures of $CCl_2F_2$ and $CHClF_2$ for the selective adsorption of $CHClF_2$.

2. The invention in claim 1 wherein said zeolite molecular sieve is represented by the formula $$Ca_6[(AlO_2)_{12}(SiO_2)_{12}]$$

3. A method of separation of $CCl_2F_2$, $CHClF_2$ mixtures with a crystalline zeolite molecular sieve material which comprises, degassing the sieve in a vacuum chamber, exposing the sieve to admitted $CCl_2F_2$ to pressures above atmospheric and temperatures of about 25° C. and higher, exposing the sieve with the adsorbed $CCl_2F_2$ to mixtures of $CCl_2F_2$ and $CHClF_2$, removing the sieve from the mixture, and desorbing $CHClF_2$ from the sieve.

4. A separator system comprising in combination, a chamber, a molecular sieve in said chamber, said molecular sieve being represented by the formula $$Ca_6[(AlO_2)_{12}(SiO_2)_{12}]$$

and saturated with $CCl_2F_2$, means to evacuate the chamber, a vessel connected to said chamber and containing a mixture of $CCl_2F_2$ and $CHClF_2$, means to cause a flow of said mixture from the vessel into the chamber for the adsorption of $CHClF_2$, and a sink vessel connected to said chamber to receive the unadsorbed gases.

5. A system for the selective adsorption of gases comprising in combination, a chamber, a molecular sieve, $Ca_6[(AlO_2)(SiO_2)_{12}]$, having $CCl_2F_2$ adsorbed thereon in said chamber, a supply vessel of mixed gases one of which is $CHClF_2$, said source being connected in fluid flow relationship with said chamber, means to evacuate the chamber, a sink vessel connected in fluid flow relationship between the chamber and the evacuation means and between the chamber and the supply vessel of mixed gases, valve means to isolate the sink vessel from the system and the evacuation means from the system, and valve means between the supply vessel of mixed gases and the chamber to provide a flow of mixed gases to the molecular sieve in said chamber.

6. The invention as claimed in claim 5 wherein heating means is provided for the chamber.

7. The invention as claimed in claim 5 wherein a gas analyzer is provided between the supply vessel and the chamber and between the chamber and the evacuation means.

8. A method of adsorbing Freon-22 which comprises, utilizing a crystalline zeolite molecular sieve, adsorbing Freon-12 on said sieve, exposing the said sieve with the adsorbed Freon-12 thereon to Freon-22 for the adsorption thereof in an amount greater in quantity than would be adsorbed by a crystalline zeolite molecular sieve not having adsorbed Freon-12 thereon.

9. The invention as recited in claim 8 wherein said molecular sieve is represented by the formula $$Ca_6[(AlO_2)_{12}(SiO_2)_{12}]$$

References Cited in the file of this patent
UNITED STATES PATENTS

| 2,554,908 | Hirschler | May 29, 1951 |
| 2,810,454 | Jones et al. | Oct. 22, 1957 |

OTHER REFERENCES

Journal of the American Chemical Society, vol. 78, No. 23, December 8, 1956, pages 5963–5971.